United States Patent
Overzier

(10) Patent No.: US 12,545,223 B2
(45) Date of Patent: Feb. 10, 2026

(54) BRAKE SYSTEM AND METHOD FOR BRAKING A VEHICLE

(71) Applicant: Robert Bosch GmbH, Stuttgart (DE)

(72) Inventor: Frank Overzier, Tiefenbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 438 days.

(21) Appl. No.: 18/255,962

(22) PCT Filed: Nov. 25, 2021

(86) PCT No.: PCT/EP2021/082922
§ 371 (c)(1),
(2) Date: Jun. 5, 2023

(87) PCT Pub. No.: WO2022/179723
PCT Pub. Date: Sep. 1, 2022

(65) Prior Publication Data
US 2024/0025386 A1    Jan. 25, 2024

(30) Foreign Application Priority Data

Feb. 23, 2021 (DE) .................... 10 2021 104 249.6

(51) Int. Cl.
*B60T 13/74* (2006.01)
*B60T 8/171* (2006.01)
(Continued)

(52) U.S. Cl.
CPC ............ *B60T 8/94* (2013.01); *B60T 8/171* (2013.01); *B60T 8/4081* (2013.01);
(Continued)

(58) Field of Classification Search
CPC .......... B60T 2270/40; B60T 2270/402; B60T 2270/404; B60T 2270/413; B60T 2270/82;
(Continued)

(56) References Cited

U.S. PATENT DOCUMENTS

| 5,952,799 A * | 9/1999 | Maisch ................... B60T 8/321 |
| | | 318/16 |
| 2014/0110997 A1* | 4/2014 | Biller ..................... B60T 8/442 |
| | | 303/9.62 |

(Continued)

FOREIGN PATENT DOCUMENTS

| DE | 102012205862 A1 | 10/2012 |
| DE | 102012210809 A1 | 1/2013 |

(Continued)

OTHER PUBLICATIONS

International Search Report for PCT/EP2021/082922, Issued May 18, 2022.

*Primary Examiner* — Bradley T King
(74) *Attorney, Agent, or Firm* — NORTON ROSE FULBRIGHT US LLP

(57) ABSTRACT

A method for braking a vehicle. The method includes: sensing a braking request signal which represents a target deceleration of the vehicle; generating, using a first pressure generating device, a hydraulic brake pressure in a wheel-brake cylinder based on the sensed braking request signal; detecting a fault state of the first pressure generating device; ascertaining a replacement braking request signal if a fault state of the first pressure generating device is detected, the replacement braking request signal being ascertained based on a target deceleration known at a predetermined time point prior to the detection of the fault state; and generating, using a brake pressure control system, a replacement brake pressure in the wheel-brake cylinder based on the ascertained (Continued)

replacement braking request signal, which brake pressure control system has a second pressure generating device which is hydraulically coupled to the wheel-brake cylinder.

13 Claims, 5 Drawing Sheets

(51) Int. Cl.
  *B60T 8/40* (2006.01)
  *B60T 8/94* (2006.01)
  *B60T 13/58* (2006.01)
  *B60T 13/62* (2006.01)
  *B60T 17/22* (2006.01)

(52) U.S. Cl.
  CPC ............ *B60T 13/588* (2013.01); *B60T 13/62* (2013.01); *B60T 17/22* (2013.01); *B60T 2220/04* (2013.01); *B60T 2270/402* (2013.01); *B60T 2270/406* (2013.01); *B60T 2270/88* (2013.01)

(58) Field of Classification Search
  CPC ............ B60T 2270/60; B60T 2270/88; B60T 13/745; B60T 13/686; B60T 2220/04; B60T 8/171; B60T 8/94
  See application file for complete search history.

(56) References Cited

U.S. PATENT DOCUMENTS

| | | | | |
|---|---|---|---|---|
| 2014/0152085 A1* | 6/2014 | Biller | ................... | B60T 13/58 |
| | | | | 303/14 |
| 2014/0203626 A1* | 7/2014 | Biller | .................. | B60T 7/02 |
| | | | | 303/14 |
| 2017/0096130 A1* | 4/2017 | Drumm | ................ | B60T 8/4081 |
| 2019/0039585 A1* | 2/2019 | Krautter | ............... | B60T 13/662 |
| 2020/0207321 A1 | 7/2020 | Plewnia | | |
| 2023/0192060 A1* | 6/2023 | Loeffelmann | ........ | B60T 13/745 |
| | | | | 188/1.11 R |
| 2025/0206281 A1* | 6/2025 | Mohamed Shareef | ..................... | |
| | | | | B60T 13/662 |

FOREIGN PATENT DOCUMENTS

| | | |
|---|---|---|
| DE | 102014225954 A1 | 6/2016 |
| DE | 102019215422 A1 | 10/2020 |
| EP | 2998173 A1 | 3/2016 |
| JP | 2009040290 A | 2/2009 |
| JP | 2019189206 A | 10/2019 |
| JP | 2020200022 A | 12/2020 |
| WO | 2020105573 A1 | 5/2020 |
| WO | 2020250695 A1 | 12/2020 |
| WO | WO-2023174494 A1 * | 9/2023 ............ B60T 17/221 |

\* cited by examiner

BRAKE SYSTEM AND METHOD FOR BRAKING A VEHICLE

FIELD

The present invention relates to a method for braking a vehicle and to a brake system for a vehicle.

BACKGROUND INFORMATION

Hydraulic brake systems are typically used in road vehicles, such as cars or trucks. Increasingly, such hydraulic brake systems are operated according to a "brake-by-wire" principle, wherein actuation of a brake pedal is sensed by sensors and a braking request, which represents a desired deceleration of the vehicle, is ascertained therefrom. A hydraulic pressure is then ascertained from the braking request and is generated by means of a pressure generating device, such as an electrically driven plunger, in a wheel-brake cylinder for braking a wheel of the vehicle.

Furthermore, brake systems of road vehicles usually comprise brake pressure control systems for wheel-specific brake pressure control, for example in order to perform an anti-lock function (ABS). Typically, such brake pressure control systems have their own pressure generating device as well as a valve assembly for wheel-specific pressure variation.

If the pressure generating device in brake systems operating according to the brake-by-wire principle fails, a main brake cylinder that can be actuated by the brake pedal is typically hydraulically connected to the wheel-brake cylinder so that the required brake pressure can be generated manually.

German Patent Application No. DE 10 2014 225 954 A1 describes a brake system, in which a pressure generating device of a brake pressure control system configured to generate wheel-specific brake pressures assumes the generation of the desired brake pressure in the event of a failure of a first, externally controlled pressure generating device.

SUMMARY

According to the present invention, methods for braking a vehicle, and a brake system re provided.

According to a first aspect of the present invention, a method for braking a vehicle is provided. According to an example embodiment of the present invention, the method comprises sensing a braking request signal, which represents a target deceleration of the vehicle, for example based on actuation of a brake actuating device; generating, by means of a first pressure generating device, a hydraulic brake pressure in a wheel-brake cylinder based on the sensed braking request signal, which pressure generating device is hydraulically connected to the wheel-brake cylinder; detecting a fault state of the first pressure generating device; ascertaining a replacement braking request signal if a fault state of the first pressure generating device is detected, wherein the replacement braking request signal is ascertained based on a target deceleration known at a predetermined time point prior to the detection of the fault state; and generating, by means of a brake pressure control system, a replacement brake pressure in the wheel-brake cylinder based on the ascertained replacement braking request signal, which brake pressure control system has a second pressure generating device which is hydraulically coupled to the wheel-brake cylinder.

According to a second aspect of the present invention, the method for braking a vehicle comprises sensing a braking request signal, which represents a target deceleration of the vehicle, for example based on actuation of a brake actuating device; generating, by means of an electric machine coupled kinematically to a wheel of the vehicle, a brake torque based on the braking request signal; providing a first pressure generating device hydraulically connected to a wheel-brake cylinder for generating a brake pressure in the wheel-brake cylinder based on the braking request signal; detecting a fault state of the first pressure generating device; ascertaining a replacement braking request signal if a fault state of the first pressure generating device is detected, wherein the replacement braking request signal based on a target deceleration known at a predetermined time point prior to the detection of the fault state is ascertained based on the brake torque generated by the electric machine; and generating, by means of a brake pressure control system, a replacement brake pressure in the wheel-brake cylinder based on the ascertained replacement braking request signal, which brake pressure control system has a second pressure generating device, which is hydraulically coupled to the wheel-brake cylinder.

According to a third aspect of the present invention, a brake system for a vehicle is provided. According to an example embodiment of the present invention, the brake system comprises a sensor for sensing a braking request or braking request signal; a wheel-brake cylinder for generating a frictional force on a wheel of the vehicle; a first pressure generating device, which is hydraulically coupled to the wheel-brake cylinder and is configured to generate a hydraulic pressure in the wheel-brake cylinder; a brake pressure control system comprising a second pressure generating device, which is hydraulically coupled to the wheel-brake cylinder and is configured to generate hydraulic pressure in the wheel-brake cylinder independently of the first pressure generating device; and a control system, which is connected by signals to the actuation sensor, the first pressure generating device and the brake pressure control system and is configured to cause the brake system to perform a method according to the first aspect of the present invention. When the method according to the third aspect of the present invention is performed, the control system may in particular comprise an interface for connection to the electric machine.

One feature of the present invention is to use, in a brake system in which the hydraulic brake pressure is generated by means of a powered pressure generating device or by means of a pressure generating device coupled non-kinematically to a brake actuating device, such as a brake pedal or a brake lever, a brake pressure control system, which is actually, for example, provided for performing an ABS or ESP function, to compensate for a failure of the pressure generating device, wherein, upon detection of a failure or fault state of the pressure generating device, the brake pressure control system initially adjusts a brake pressure that corresponds to a brake pressure known prior to the detection of the failure or that is equivalent to a brake torque generated by an electric machine. That is to say, it is not necessary to resort to sensing a braking request signal generated, for example, by the driver, but rather a brake pressure that corresponds to a desired target deceleration known at a specific, previous time point is initially automatically adjusted. This replacement brake pressure is thus generated exclusively based on the ascertained or correspondingly generated replacement braking request signal, wherein the replacement braking request signal may in particular be constant, at least for a predetermined time period. The present invention can in this case be used both for purely hydraulic braking, braking in which the brake torque is generated partially by an electric machine operated as a generator and partially hydraulically or by means of the wheel-brake cylinder, and for purely regenerative braking, in which the brake torque is initially generated entirely by an electric machine operated as a generator. In the latter case or according to the second aspect of the present invention, the first pressure generating device is provided in order to intervene, for example, as a backup or additionally subsequently. If the first pressure generating device fails during purely regenerative braking before it generates a brake pressure in the wheel-brake cylinder, regenerative braking is terminated and the brake pressure control system generates the brake pressure in the wheel-brake cylinder based on the last valid brake torque that the electric machine generated prior to the failure of the first pressure generating device.

A fault state of the first pressure generating device, which may, for example, be a plunger driven by an electric motor, can generally be detected if the pressure generating device is no longer capable of adjusting the desired brake pressure. This may be the case, for example, if the pressure generating device itself is defective, for example because the electric motor is overheated or otherwise damaged, or if the pressure generating device does not receive an actuation signal. The latter case may occur, for example, if sensing the braking request signal no longer works or if ascertaining the brake pressure, for example by means of a control unit, no longer works.

An advantage of the present invention is that immediately after failure of the first pressure generating device, a brake pressure can be generated by means of the second pressure generating device of the brake pressure control system based on a braking request known prior to the failure. That is to say, it is not necessary to first wait for a response of the driver, which may, for example, consist of pushing more on the brake pedal or pulling the brake lever more. The braking distance can thus be advantageously shortened.

Advantageous embodiments and developments of the present invention emerge from the description herein with reference to the figures.

According to some embodiments of the present invention, it may be provided that sensing a braking request signal comprises sensing actuation of a brake actuating device. For example, an actuation sensor can sense the travel of a brake pedal or of a brake lever, wherein the braking request signal is generated based on the sensed travel. Other types of actuation sensing are also possible, e.g., sensing a pressure generated by actuation of the brake actuating device in a simulator. Generally speaking, sensing of the braking request signal may take place based on actuation of a brake actuating device.

According to some embodiments of the present invention, it may be provided that ascertaining the replacement braking request signal comprises ascertaining a travel of a brake actuating device at the predetermined time point prior to the detection of the fault state. The travel of the brake actuating device, such as a pedal or lever, can in particular be ascertained by means of a travel sensor, as already explained. The ascertained travel may be sensed in a time-resolved manner and, for a predetermined, in particular moving, time period, the sensed values can be stored so that even in the event of a failure of the travel sensor and/or of the first pressure generating device, the last valid values can be accessed and are then used for ascertaining the replacement braking request. In this way, safety is further improved.

According to some embodiments of the present invention, it may be provided that ascertaining the replacement braking request signal comprises ascertaining a brake pressure in the wheel-brake cylinder at the predetermined time point prior to the detection of the fault state. For example, in a hydraulic path connecting the first pressure generating device to the wheel-brake cylinder, the pressure can be sensed by means of a sensor, in particular, in a time-resolved manner, wherein, for a predetermined, in particular moving, time period, the sensed values can be stored so that the last valid values can be accessed even in the event of a failure of the first pressure generating device and are then used for ascertaining the replacement braking request. In this way, safety is further improved.

According to some embodiments of the present invention, the method may comprise generating a brake torque by means of an electric machine kinematically coupled to a wheel of the vehicle, based on the braking request signal. This may be advantageous, for example, in electrically driven vehicles or hybrid vehicles, wherein the desired target deceleration takes place partially by operating the electric machine as a generator and partially by means of the wheel-brake cylinder. The hydraulic brake pressure generated in the wheel-brake cylinder by the first and/or the second pressure generating device thus also depends on what proportion of the target deceleration the electric machine provides.

According to some embodiments of the present invention, it may be provided that the replacement brake torque is ascertained based on the brake torque generated by the electric machine. For example, a control unit of the electric machine, e.g., a power electronics, may output a machine control signal representing the brake torque generated by the electric machine, to the control system of the hydraulic brake system, which ascertains, on the basis of this machine control signal, which brake torque must be generated by the friction-brake cylinder.

According to some embodiments of the present invention, it may be provided that the brake pressure control system comprises a first control unit actuating the second pressure generating device, and wherein a fault state of the first pressure generating device is detected on the basis of a control signal sent to the first control unit. For example, a fault state can be recognized if the control signal is absent or if an error signal instead of the control signal is sent to the first control unit. The first control unit may in particular comprise a processor unit, e.g., comprising one or more CPUs, FPGAs, ASICS, or the like, and a data store, in particular a non-volatile data store, such as an HDD store or an SSD store. For example, software executable by the processor unit may be stored in the data store in order to output output signals, in particular actuation signals, to the second pressure generating device and optionally to valves in order to actuate the latter. For example, the output signals may be generated based on the control signal and/or based on a pressure signal representing a current pressure applied to a suction side of the second pressure generating device. For example, the first control apparatus may be configured to cause the pressure generating device, where applicable in cooperation with a valve assembly, to perform an anti-lock function and/or to vary the brake pressure in a wheel-specific manner.

According to some embodiments of the present invention, it may be provided that the first pressure generating device is actuated by a second control unit based on the braking request signal, wherein the second control unit generates the first control signal and sends it to the first control unit. The second control unit may in particular comprise a processor unit, e.g., comprising one or more CPUs, FPGAs, ASICs, or the like, and a data store, in particular a non-volatile data store, such as an HDD store or an SSD store. For example, software executable by the processor unit may be stored in the data store in order to output output signals, in particular actuation signals, to the first pressure generating device and optionally to valves in order to actuate the latter. For example, the second control unit may ascertain the brake pressure based on the braking request signal, which may be output, for example, by a travel sensor coupled to the brake actuating device, and actuate the first pressure generating device accordingly. The second control apparatus may, for example, communicate, the ascertained brake pressure, the travel of the brake actuating device, or another variable proportional to the target deceleration, in the control signal to the first control apparatus. Optionally, the first control apparatus may store the control signals obtained from the second control device, in its data memory for a specific, moving time period so that, in the event of a fault state of the pressure generating device, the stored values can be accessed in order to be able to more easily ascertain the replacement braking request signal.

According to some embodiments of the present invention, it may be provided that generating the replacement brake pressure comprises generating a linear, a stepwise, and/or a progressive, or a degressive pressure increase in the wheel-brake cylinder.

According to some embodiments of the present invention, it may be provided that, by the actuation by the brake actuating device, which, as already explained, may, for example, be a brake pedal or a brake lever, a hydraulic return pressure is generated in a return simulator by means of a main brake cylinder, and wherein, if a fault state of the first pressure generating device is detected, the main brake cylinder is hydraulically coupled to the wheel-brake cylinder, and the first pressure generating device is preferably hydraulically separated from the wheel-brake cylinder. The main brake cylinder may, for example, be hydraulically connected to and separated from the wheel-brake cylinder by a first separator valve. The first pressure generating device may similarly be hydraulically connected to and separated from the wheel-brake cylinder by a second separator valve. When the first pressure generating device is in an operable state, the first separator valve is closed and the main brake cylinder, which is kinematically coupled to the brake actuating device, is thereby hydraulically separated from the wheel-brake cylinder. In the event of a fault state of the first pressure generating device, the first separator valve is opened and the second separator valve is optionally closed. This hydraulically connects the main brake cylinder to the wheel-brake cylinder. This leads to the driver feeling the actual prevailing brake pressure, and no longer only the return force of the simulator, at the brake actuating device. In addition, opening the first separator valve results in a volume displacement out of the wheel-brake cylinder into the main brake cylinder and thus in a drop in brake pressure. This would actually have to be compensated by the driver through further actuation of the brake actuating device, for example by pushing more on the brake pedal. Since, according to the present invention, the brake pressure control system can however assume pressure generation at least transitionally and adjusts the last known brake pressure, the driver is given more time to respond, which advantageously improves the ease of use and the safety.

According to some embodiments of the present invention, it may be provided, wherein the replacement brake pressure is generated for a predetermined first time period based on the ascertained replacement braking request signal and the replacement braking request signal is subsequently reduced to zero within a transition period, in particular linearly, wherein during the transition period, the replacement brake pressure is generated by means of the brake pressure control system based on a sum of the replacement braking request signal and the sensed braking request signal. Accordingly, after reaching the replacement brake pressure adjusted based on the replacement braking request signal, the replacement braking request signal is reduced, which simultaneously leads to a reduction in the replacement brake pressure. In order to keep the deceleration of the vehicle constant, this reduction must be compensated by actuating the brake actuating device and thus generating a corresponding braking request signal. A transition sequence is thus provided, in which the replacement braking request signal is increasingly reduced, e.g., linearly decreased.

According to some embodiments of the brake system of the present invention, the sensor for sensing the braking request signal may be an actuation sensor designed to sense an actuation, in particular a travel, of a brake actuating device. Sensing a travel, e.g., of a pedal or of a brake lever, is advantageously relatively fail-safe. In addition, the actuation signals sensed by an actuation sensor may be easily converted and stored, which facilitates the generation of the replacement braking request signal.

The features and advantages disclosed herein for one aspect of the present invention are also in each case disclosed for the other aspects of the present invention, and vice versa.

The present invention is explained below with reference to the figures.

DETAILED DESCRIPTION OF EXAMPLE EMBODIMENTS

In the figures, identical reference signs denote identical or functionally identical components unless stated otherwise.

Figure 1A:
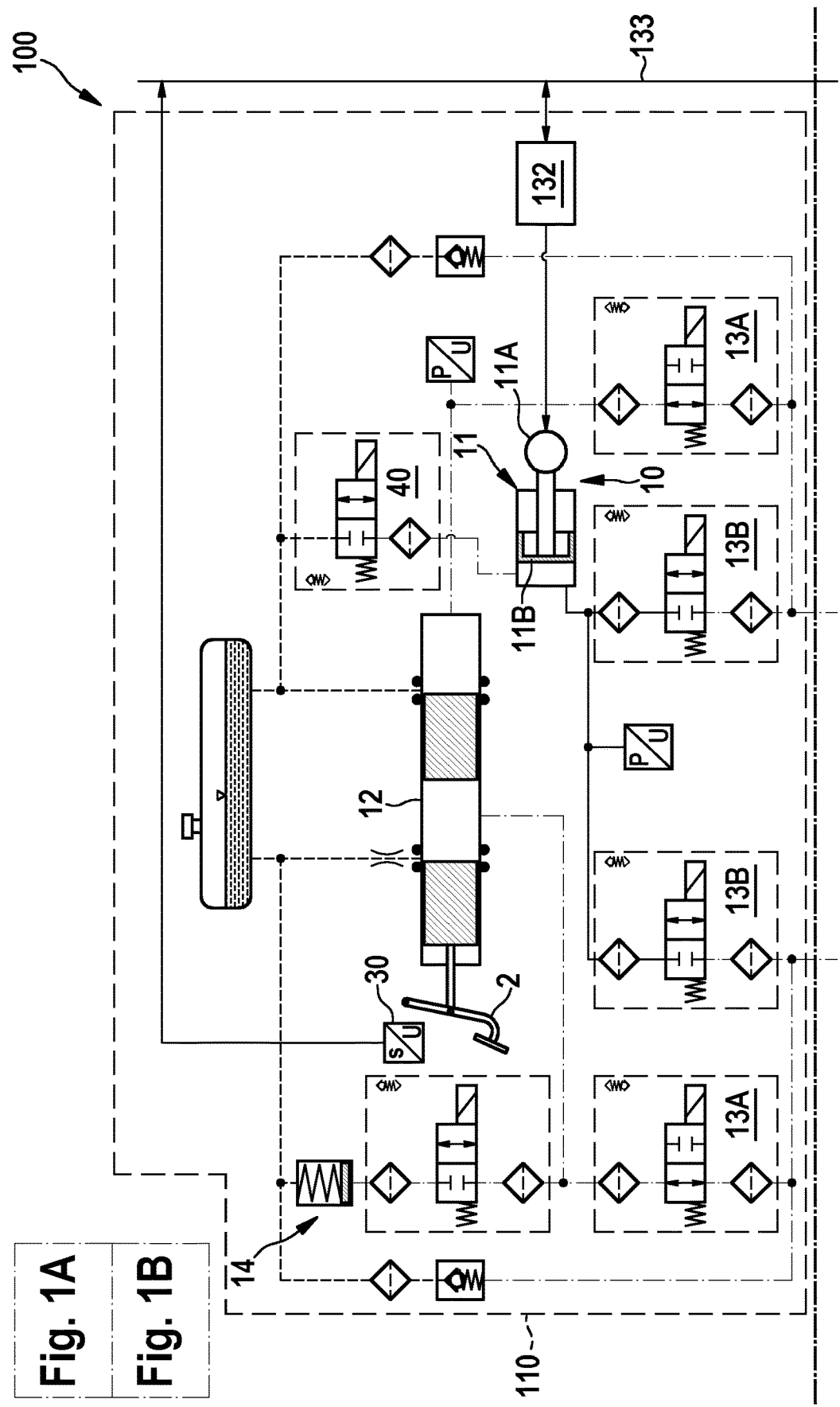
FIGS. 1A and 1B show a schematic representation of a hydraulic schematic of a brake system according to an exemplary embodiment of the present invention.
Figure 1B:
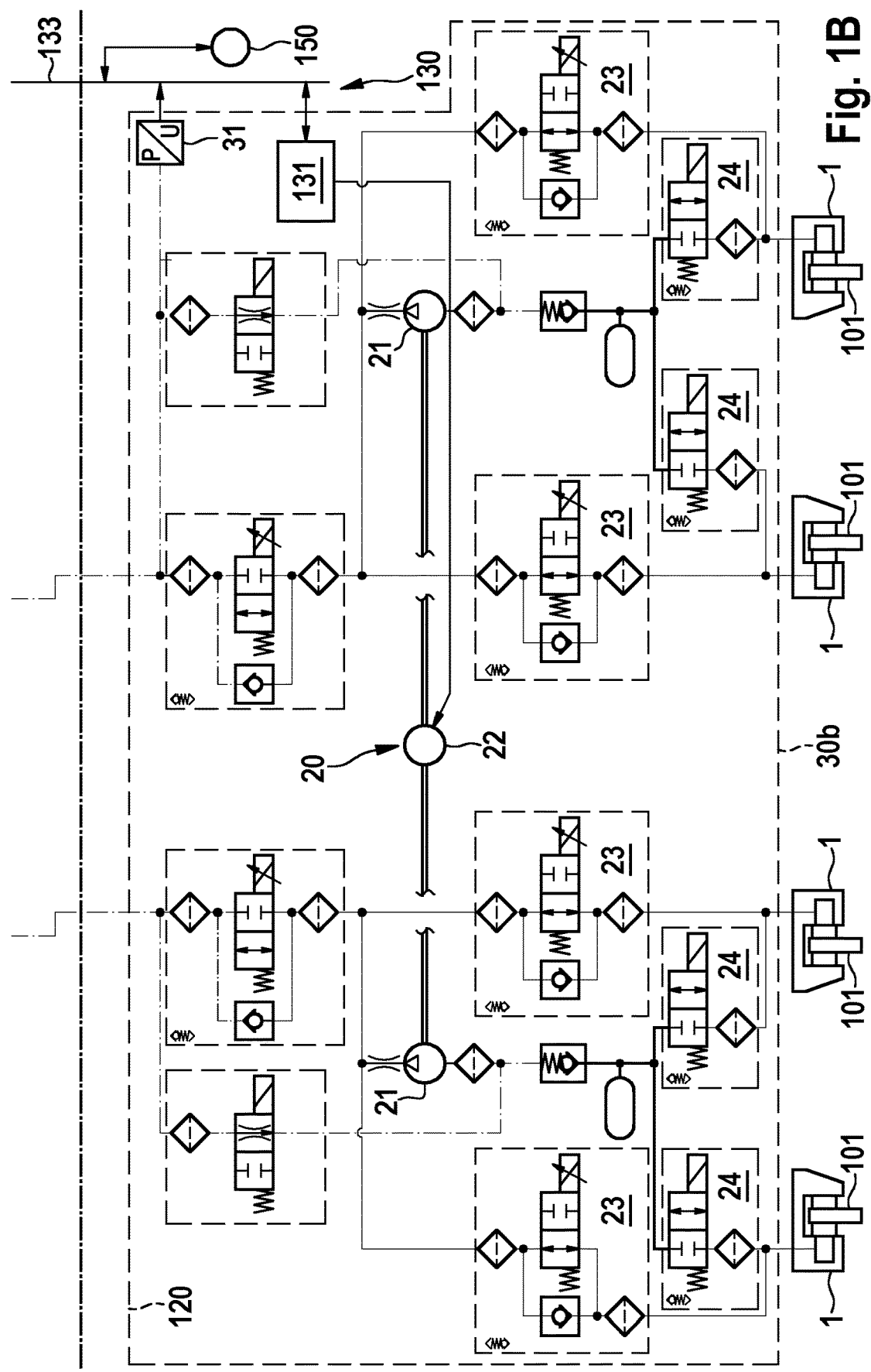

FIGS. 1A and 1B schematically show a brake system 100 for a vehicle, in particular for a road vehicle, such as a car, bus, or truck. The brake system 100 comprises at least one wheel-brake cylinder 1, a brake force generation assembly 110, a brake pressure control system 120, and a control system 130. The brake force generation assembly 110 is shown in FIG. 1A; the brake pressure control system 120 is shown in FIG. 1B. Portions of the control system 130 can be found in both FIG. 1A and FIG. 1B.

As shown by way of example in FIG. 1B, a wheel-brake cylinder 1 may in particular be provided per wheel. The wheel-brake cylinder 1 is designed to convert a hydraulic pressure into a movement of a friction pad in order to push the latter by means of a contact force proportional to the hydraulic pressure, against a friction piece 101 coupled to the wheel, so that a frictional or brake force impeding the rotation of the wheel is generated.

As shown in FIG. 1A, the brake force generation assembly 110 comprises an actuation sensor 30 and a first pressure generating device 10. Optionally, the brake force generation assembly 110 may furthermore comprise a main brake cylinder 12 kinematically coupled to a brake pedal 2, as well as a reservoir 15 for receiving brake fluid. A brake lever or, generally speaking, a brake actuating device could also be provided instead of a brake pedal 2. Reference is made below to a brake pedal 2 for reasons of clarity, wherein the present invention is not limited thereto.

The actuation sensor 30 is used to sense a braking request, which represents a target deceleration of the vehicle. For example, the actuation sensor 30 may be a travel sensor configured to sense a travel or a displacement of a brake pedal 2 actuatable by a driver.

The main brake cylinder 12 is kinematically coupled to and actuatable by the brake pedal 2. By displacing the brake pedal 2, brake fluid is transported out of the main brake cylinder 12. As FIG. 1A shows by way of example, the main brake cylinder 12 can be hydraulically coupled to a return simulator 14, which generates a return force proportional to the actuating path of the pedal 2. Furthermore, the main brake cylinder 12 can be hydraulically coupled to and separated from the wheel-brake cylinder 1 via first separator valves 13A. By way of example, FIG. 1A shows a state in which the first separator valves 13A are opened and the main brake cylinder 12 is thus hydraulically coupled to the wheel-brake cylinders 1. The first separator valves 13A may, for example, be switchable solenoid valves, which are normally open.

As FIG. 1A shows by way of example, the first pressure generating device 10 may, for example, be designed as a plunger 11 comprising a piston 11B that can be displaced by a motor, in particular an electric motor 11A. The first pressure generating device 10 is hydraulically connected to the wheel-brake cylinder 1. In particular, the first pressure generating device 10 may be hydraulically couplable to and separable from the wheel-brake cylinder 1 via second separator valves 13B, as shown by way of example in FIGS. 1A, 1B. Purely by way of example, FIG. 1A shows a state in which the second separator valves 13B are closed and the first pressure generating device 10 is thus hydraulically separated from the wheel-brake cylinders 1. The second separator valves 13B may, for example, be switchable solenoid valves, which are normally closed.

The brake pressure control system 120 is generally used to adjust a wheel-specific brake pressure, e.g., to perform an anti-lock function, such as ABS or ESP. As shown schematically in FIG. 1B, the brake pressure control system 120 comprises a second pressure generating device 20, which can be actuated independently of the first pressure generating device 10. As shown by way of example in FIG. 1B, the second pressure generating device 20 may comprise, for example, a pump 21 per two wheels or wheel-brake cylinders 1, wherein the pumps 21 are actuated by a common motor 22, e.g., an electric motor. However, it is also possible that a pump 21 is provided for each wheel or each wheel-brake cylinder 1. As shown schematically in FIG. 1B, the pump 21 is arranged in a hydraulic path connecting the first pressure generating device 10 and, with the first separator valves 13A open, the main brake cylinder 12 to the respective wheel-brake cylinder 1. As also shown schematically and purely by way of example in FIG. 1B, the brake pressure control system 120 may comprise an inlet valve 23 and an outlet valve 24 per wheel-brake cylinder 1, wherein the inlet valve 23 is arranged in a hydraulic path connecting a pressure output of the pump 21 to the wheel-brake cylinder 1, and wherein the inlet valve 23 is arranged in a hydraulic path connecting a suction inlet of the pump 21 to the wheel-brake cylinder 1. The inlet and outlet valves 23, 24 may in particular be switchable solenoid valves so that a wheel-specific brake pressure adjustment is possible by operating the second pressure generating device 20 and actuating the inlet and outlet valves 23, 24.

In particular, the control system 130 may comprise a first control unit 131 and a second control unit 132. However, it is also in principle possible to provide only one control unit. The control units 130 may in particular comprise a processor unit (not shown), e.g., comprising one or more CPUs, FPGAs, ASICS, or the like, and a data store (not shown), in particular a non-volatile data store, such as an HDD store or an SSD store. For example, software that is executable by the respective processor unit to generate output signals may be stored in the data store.

The first and second control units 131, 132 are connected by signals, e.g., through a data bus 133, such as a CAN bus. Furthermore, the actuation sensor 30 is connected to the first and/or second control units 131, 132, e.g., via the data bus 133 or another wireless or wired connection. The first pressure generating device 10 is furthermore connected by signals to the second pressure generating device 20 and, where applicable, to the inlet and outlet valves 23, 24. For example, this signal connection may likewise be realized via the data bus 133 or another wired or wireless connection. The second control unit 132 is connected by signals to the first pressure generating device 10 as well as to the first and second separator valves 13A, 13B, e.g., via the data bus 133 or another wired or wireless connection. The control system 130 is thus connected by signals to the actuation sensor 30, the first pressure generating device 10, and the brake pressure control system 120. Optionally, the control system 130 may furthermore be connected by signals to an electric machine 150, for example via the data bus 133 or another wired or wireless connection. The electric machine 150 is kinematically coupled to one or more wheels of the vehicle and can be operated as both a motor and a generator. For example, the first and/or second control units 131, 132 may have an interface for connection to the electric machine 150.

Figure 2:
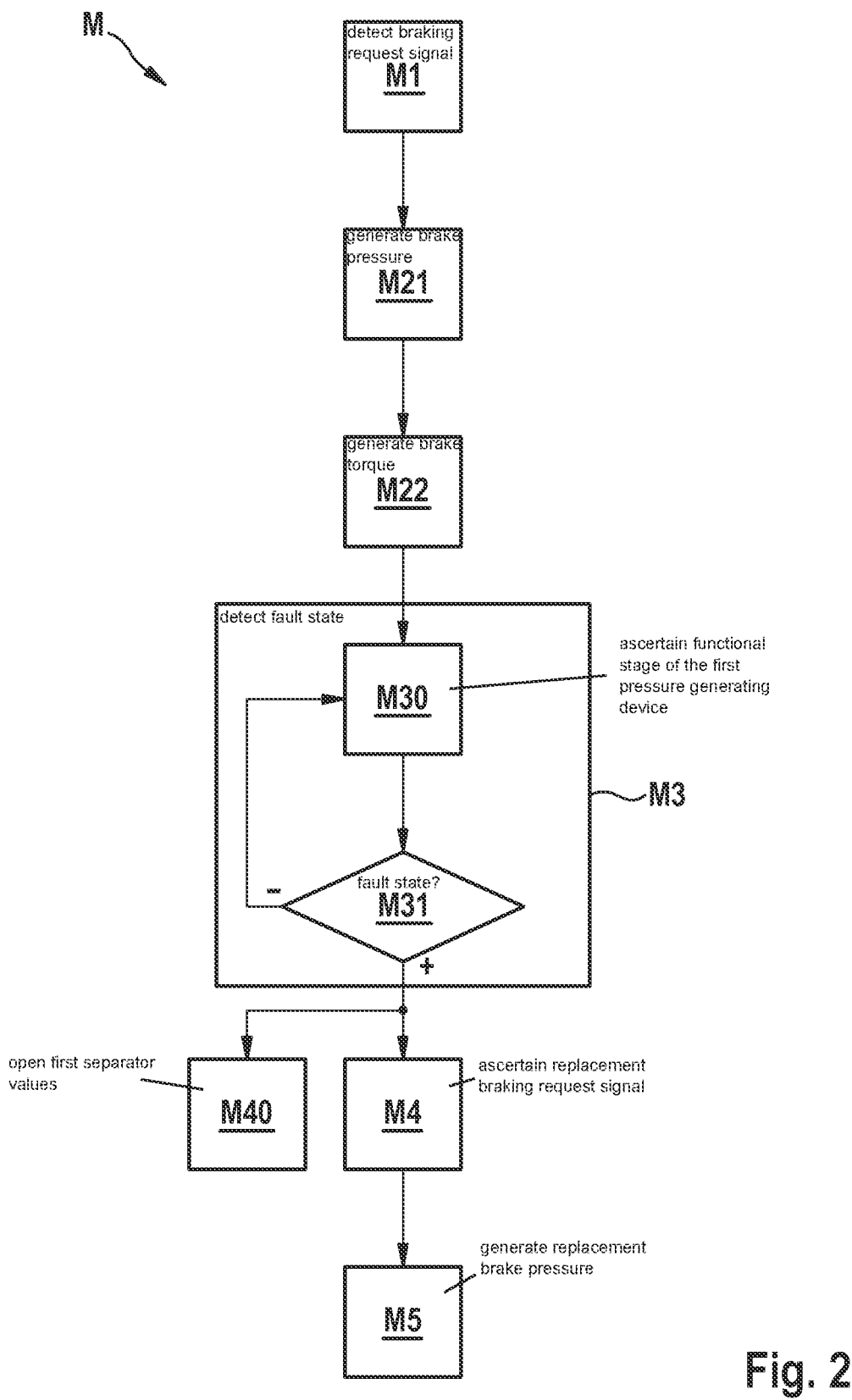
FIG. 2 shows a schematic representation of a flow diagram of a method according to an exemplary embodiment of the present invention.

FIG. 2 schematically illustrates the flow of a method M for braking a vehicle. This method M may, in particular, be carried out by means of the brake system 100 explained above. In particular, the control system 130 may be configured to cause the brake system 100 to perform this method M. The method M is therefore explained below with reference to the brake system 100 shown in FIGS. 1A and 1B.

In a first step M1 of the method, a braking request signal is sensed, which represents a target deceleration of the vehicle. For example, the braking request signal may be sensed based on the actuation of the brake pedal 2 or, generally speaking, of a brake actuating device, for example by means of the travel sensor 30.

In a further step M21, a brake pressure in the wheel-brake cylinder 1 is generated by means of the first pressure generating device 10 based on the sensed braking request signal. For example, the second control unit 132 may ascertain, from the sensed braking request signal, the brake pressure which needs to be adjusted in the wheel-brake cylinder in order to achieve the desired deceleration, and output a corresponding actuation signal to the first pressure generating device 10 in order to cause it to adjust the brake pressure. As an alternative or in addition to step M21, a brake torque is generated based on the braking request signal in a step M22 by means of the electric machine 150 kinematically coupled to a wheel of the vehicle. In particular, in the case of an electrically driven vehicle or a hybrid vehicle, the electric machine 150 driving the wheel may be operated as a generator in order to brake the vehicle. It should be noted that the brake force generation assembly 110 and the brake pressure control system 120 are also provided if purely regenerative braking is carried out exclusively by means of the electric machine 150, e.g., in the event that the brake torque generated by the electric machine 150 is not sufficient to achieve the desired deceleration of the vehicle.

In step M3, a fault state of the first pressure generating device 10 is detected M3. For example, in a step M30, the functional state of the first pressure generating device 10 may be ascertained. In a further step M31, it may be ascertained whether the functional state corresponds to a fault state. A fault state of the first pressure generating device 10 may be present if it is no longer capable of adjusting the desired brake pressure. This may be the case, for example, if the pressure generating device 10 itself is defective, e.g., because the electric motor 11 is damaged, or if the pressure generating device 10 no longer receives an actuation signal from the second control unit 132. The latter case may occur, for example, if sensing the braking request signal no longer works, for example due to a defect of the sensor 30, or if ascertaining the brake pressure by means of the second control unit 132 no longer works. The fault state may, for example, be detected by means of the first control unit 131 by evaluating a control signal sent to the first control unit 131. For example, the second control unit 132 may send the first control signal to the first control unit 131. The first control signal may, for example, contain the brake pressure ascertained by the second control unit 132, the braking request signal, and/or a status signal representing the functional state. The first control unit 131 may thus, for example, detect a fault state of the first pressure generating device 10 based on the functional state contained in the control signal, based on an absence of the control signal from the second control unit 132, or based on characteristic variables in the control signal, such as a gradient.

For example, if it is determined in step M31 that there is no fault state, as indicated by the "−" sign in FIG. 2, the method may return to step M30. If, in step M31, it is determined that a fault state exists, as indicated by the "+" sign in FIG. 2, the method proceeds to steps M4 and optionally M40. In the optional step M40, the first separator valves 13A are opened, for example by the second control unit 132, and the second separator valves 13B continue to be optionally closed, for example by the second control unit 132. If a fault state of the first pressure generating device is detected, the main brake cylinder 12 is thus hydraulically coupled to the wheel-brake cylinder 1 and the first pressure generating device 10 is hydraulically separated from the wheel-brake cylinder 1.

In step M4, a replacement braking request signal is ascertained based on a target deceleration known at a predetermined time point prior to the detection of the fault state. This may, for example, take place by means of the first control unit 131. For example, the latter may ascertain a travel of the brake pedal 2 at the predetermined time point prior to the detection of the fault state. This may, for example, take place by the first control unit 131 receiving the signal of the actuation sensor for example directly from the actuation sensor 30 or from the second control unit 132, and storing the values temporarily for a certain time period. For example, the values for the past 500 ms from the current time point may always be stored. A last valid value may then be used to ascertain, from the travel, the brake pressure to be adjusted in the wheel-brake cylinder 1. Alternatively or additionally, ascertaining the replacement braking request signal may comprise ascertaining a brake pressure in the wheel-brake cylinder 1 at the predetermined time point prior to the detection of the fault state. For example, the first control unit 131 may be connected to a pressure sensor 31, which senses a pressure in the hydraulic path connecting the first pressure generating device 10 to the wheel-brake cylinder 1, in particular at a location in front of the suction inlet of the pump 21 of the second pressure generating device 20, as shown by way of example in FIG. 1B. In this case as well, the first control unit 131 may store the values the recorded by the pressure sensor 31, temporarily for a certain time period, e.g., the values for the past 500 ms from the current time point. A last valid value may then be used as the target pressure to be adjusted in the wheel-brake cylinder 1. For example, the last valid value may be a past value by a predetermined time interval, e.g., 200 ms. If, in addition to the brake system 100, an electric machine 150 is operated as a generator to brake the vehicle, as described above, the replacement brake torque may, alternatively or additionally, also be ascertained based on the brake torque generated by the electric machine 150. For example, the first control unit 131 may be connected to a power electronics of the electric machine 150 and obtain from it the brake torque generated by means of the electric machine 150. From this brake torque, the last valid braking request can then be calculated and the required hydraulic brake pressure can be ascertained therefrom. If the brake torque was generated exclusively by the electric machine 150 in step M22, the replacement brake torque is ascertained based on the brake torque generated by the electric machine 150. Optionally, ascertaining the replacement braking request signal in this case may additionally comprise ascertaining a brake pressure in the wheel-brake cylinder 1 at the predetermined time point prior to the detection of the fault state, for example by means of the pressure sensor 31, as described above. Generally speaking, the replacement braking request signal can be ascertained as a constant value corresponding to the last valid braking request signal.

In step M5, a replacement brake pressure is then generated in the wheel-brake cylinder 1 based on the ascertained replacement braking request signal by means of the second pressure generating device 20 of the brake pressure control system 120. For this purpose, the first control unit 131 outputs an actuation signal to the second pressure generating device 20 to cause the latter to adjust the ascertained replacement brake pressure. Furthermore, the first control unit 131 opens the inlet valve 23 and closes the outlet valve 24 of the respective wheel-brake cylinder 1. For example, generating M5 the replacement brake pressure may comprise generating a linear, a stepwise, and/or a progressive or a degressive pressure increase in the wheel-brake cylinder 1. Optionally, in step M5, generating a brake torque may be stopped by means of the electric machine 150. Optionally, in step M5, the replacement braking request signal for a predetermined first time period may be generated based on the ascertained replacement braking request signal. During the first time period, the replacement braking request signal can in particular be constant. Subsequently to the first time period, the replacement braking request signal can be reduced, e.g., linearly, to zero within a transition period. During the transition period, the replacement brake pressure is generated by means of the brake pressure control system based on a sum of the replacement braking request signal and of the sensed braking request signal.

An advantage of the described method M is that once a failure of the first pressure generating device has been recognized, a replacement braking request is ascertained based on input variables ascertained prior to the failure of the first pressure generating device. There is thus no need to wait until the driver re-actuates the brake pedal, to generate a new valid input value, which may be necessary, for example, if there is a drop in brake pressure in the wheel-brake cylinder 1 as a result of the opening of the first separator valves 13A. Based on the replacement braking request, a target brake pressure, which at least approximately corresponds to the last valid target brake pressure, can be ascertained very quickly by means of the control system 130 and adjusted immediately by the brake pressure control system.

Figure 3:
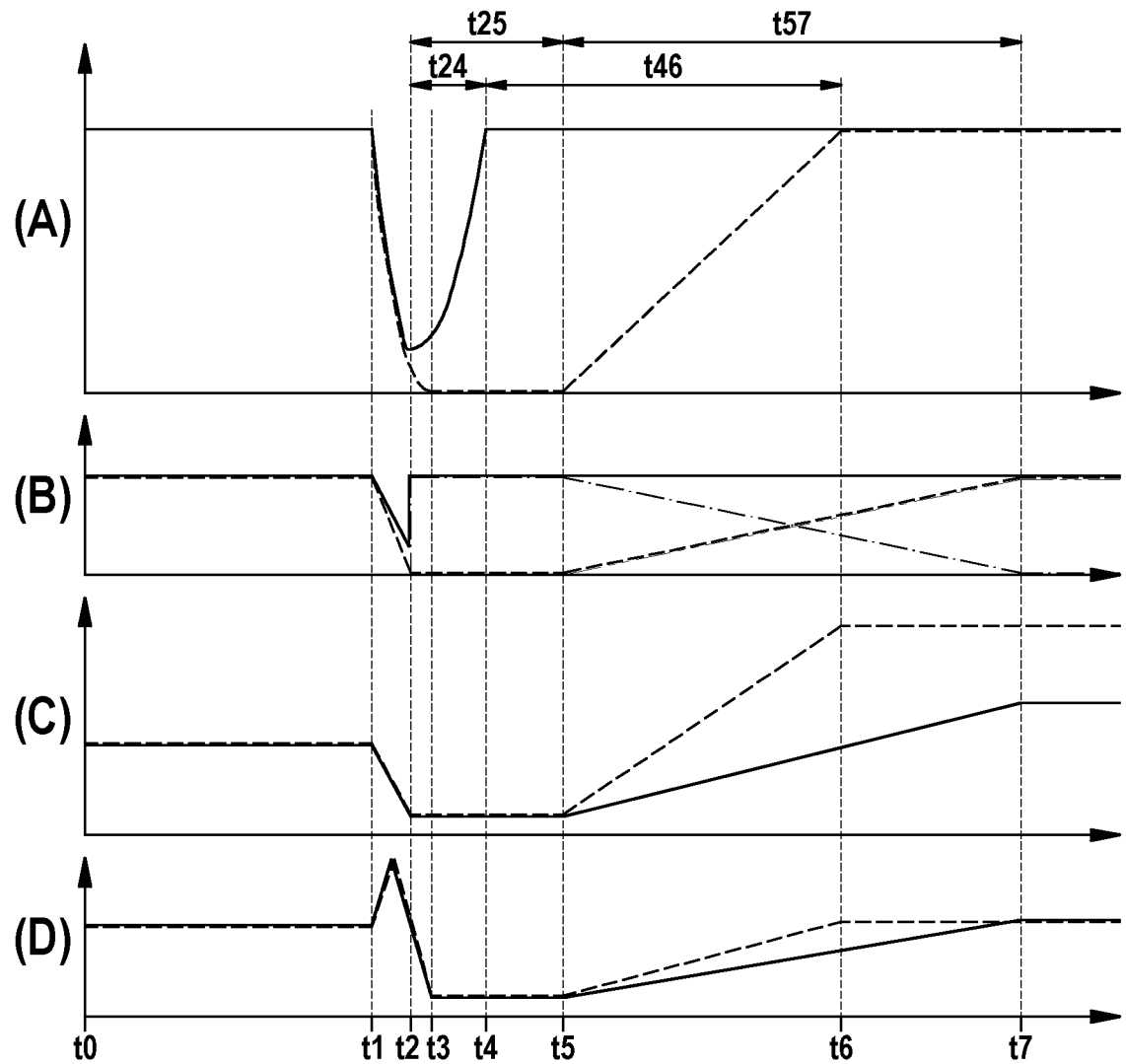
FIG. 3 shows a qualitative representation of the profiles of a brake pressure, of a travel of a brake pedal, and of a braking request during a method according to an exemplary embodiment of the present invention.
Figure 4:
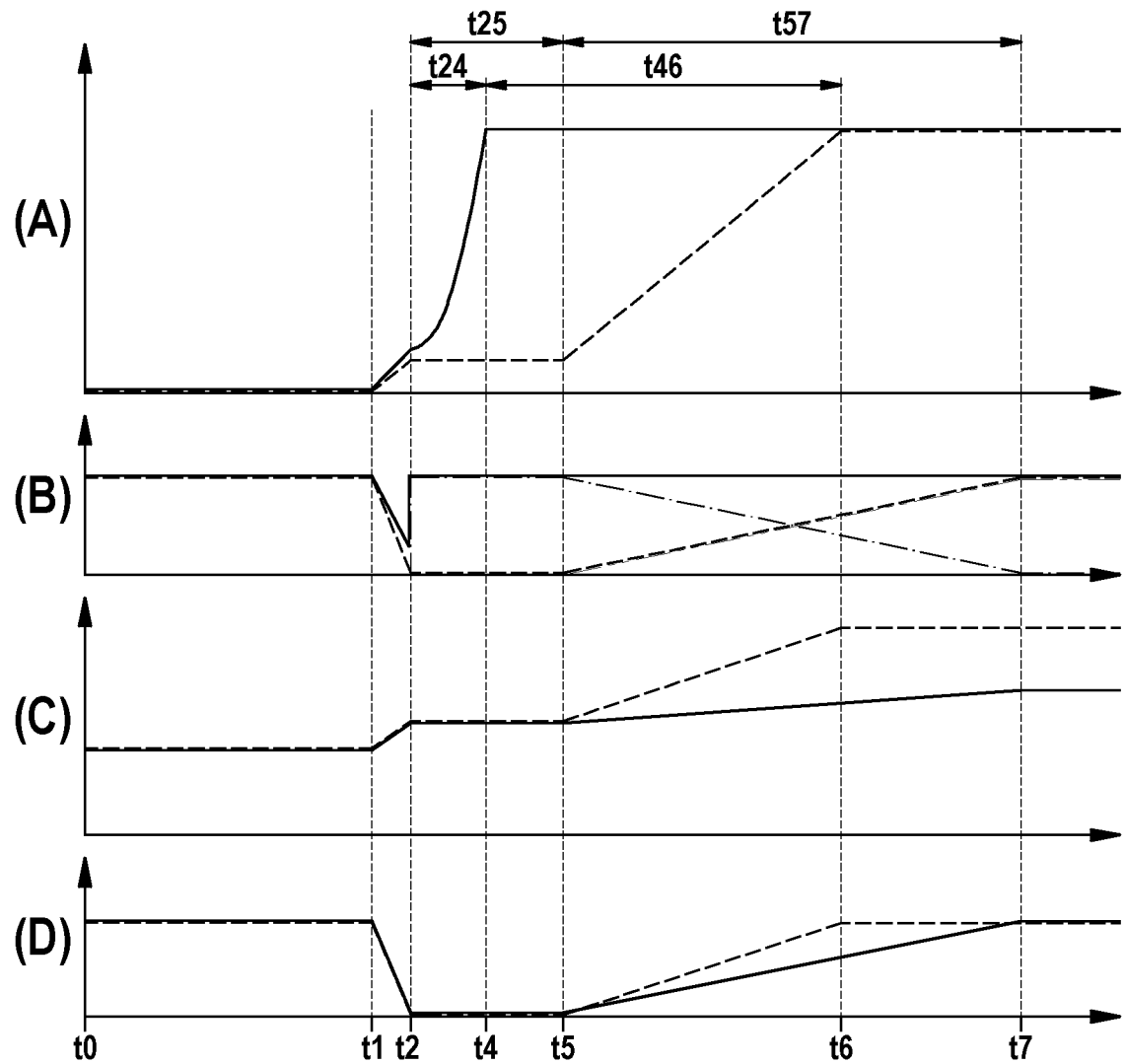
FIG. 4 shows a qualitative representation of the profiles of a brake pressure, of a travel of a brake pedal, and of a braking request during a method according to a further exemplary embodiment of the present invention.

FIGS. 3 and 4 illustrate these and further advantages of the described method M. FIG. 3 shows four diagrams (A), (B), (C), (D), in which the abscissae are in each case the time axis valid for all diagrams (A) to (D). The current brake pressure in the wheel-brake cylinder 1 is plotted on the ordinate of diagram (A). The current braking request signal or the current replacement braking request signal is plotted on the ordinate of diagram (B). The travel of the brake pedal 2 is plotted on the ordinate of diagram (C). An opposing force is plotted on the ordinate of diagram (D). Diagrams (A) to (D) in FIG. 3 show a braking sequence performed according to the described method M with the brake system 100 described above, wherein the deceleration of the vehicle is fully or at least partially achieved by the brake system 100 t.

At the time point t0 shown in FIG. 3, the brake pressure is generated by means of the first pressure generating device 10 in the manner described above. That is to say, steps M1, M21 and M3 are performed. As can be seen in diagram (C) of FIG. 3, the pedal 2 is held displaced by a constant travel. Accordingly, the braking request shown in diagram (B) of FIG. 3, as well as the opposing force on the pedal 2 shown in diagram (D) of FIG. 3 are constant. Accordingly, the first pressure generating device 10 generates a constant brake pressure in the wheel-brake cylinder 1, as shown in diagram (A) of FIG. 3.

At the time point t1, during the performance of the step M3, a fault state of the first pressure generating device 10 is detected. The first separator valves 13A are therefore opened and the second separator valves 13B are preferably closed, as described above. Diagram (A) of FIG. 3 shows, in a solid line, the further profile of the brake pressure generated by performing the method M by means of the brake pressure control system 120. The dashed line shown in diagram (A) of FIG. 3 shows the brake pressure that the brake pressure control system 120 would generate if it were actuated exclusively on the basis of the braking request signal and not based on the replacement braking request signal. As can be seen in diagram (A) of FIG. 3, the brake pressure occurs abruptly at the time point t1 since brake fluid flows at high pressure into the main brake cylinder 12 as a result of opening the first separator valves 13A. Accordingly, the pedal 2 is pushed back (diagram (C) of FIG. 3) and the opposing force on the pedal 2 increases (diagram (D) of FIG. 3). Due to the change in the pedal travel 2, the braking request also decreases, as can be seen in FIG. 3 in diagram (B). It may optionally also be provided that upon detection of a fault state in the brake force generation assembly 110 or in the first pressure generating device 10, the braking request signal is initially generated based on the pressure sensed by the pressure sensor 31, for example because the actuation sensor 30 has failed. In this case as well, the braking request would be reduced at the time point t1 since the brake pressure decreases as a result of opening the first separator valves 13A. In diagram (B), the dashed line shows the braking request that would result exclusively from the actuation of the brake pedal 2, which corresponds to the braking request signal. The dot-dashed line in diagram (B) of FIG. 3 shows the replacement braking request signal generated in step M4 of the method M explained above.

As can be seen from the dot-dashed line in diagram (B) in FIG. 3, the replacement braking request signal is generated (step M4 of the method M) from the time point t2. The delay at the time point t1 results, for example, due to the evaluation time or computing time required by the control system 130, in particular the first control unit 131, to ascertain the replacement braking request signal. As can be seen in diagram (B) of FIG. 3, the replacement braking request signal is generated to correspond to the last valid braking request signal prior to the time point t1. Due to the replacement braking request signal, the second pressure generating device 20 of the brake pressure control system 120 starts to build up the brake pressure in the wheel-brake cylinder 1 again, wherein at the time point t4, the brake pressure that existed prior to the failure of the first pressure generating device in the wheel-brake cylinder 1 is again reached, as can be seen from the profile of the solid line in diagram (A) of FIG. 3. The time interval t24 between the time points t2 and t4 may thus be referred to as the response time of the brake pressure control system 120. As can be seen from the dashed line in diagram (A) of FIG. 3, without the described method M, the pressure would decrease further until an equilibrium is reached between the opposing force on the brake pedal 2 and the brake pressure at the time point t3. Thereafter, the driver will need a certain response time to push the pedal 2 further again, which will happen again from the time point t5, as can be seen in diagrams (C) and (D) of FIG. 3. The time interval t25 between the time points t2 and t5 can thus be considered as the response time of the driver.

In diagrams (A) to (C), the dashed line shows in each case the profile that would result without the above-described method M if the actuation of the pedal 2 were exclusively used to generate the braking request signal. As can be seen from the profile of the dashed lines in diagrams (C) and (D) of FIG. 3, the travel of the pedal 2 is increased again from the time point t5 due to the increase in the pedal force. Accordingly, the braking request signal is ascertained and the braking request increases again, as can be seen from the dashed line in diagram (B) of FIG. 3, whereby the brake pressure control system 120 is caused to adjust the brake pressure accordingly, wherein at the time point t6, the brake pressure that existed prior to the failure of the first pressure generating device 10 is reached (dashed line in diagram (A) of FIG. 3). The time interval t46 thus represents the reduction in time that can be achieved by the above-described method M in order to restore the brake pressure present prior to the failure of the first pressure generating device 10.

As shown by way of example in diagrams (B) to (D) of FIG. 3, a transition sequence may be carried out from the time point t5 during the performance of the method M. As already explained, during the performance of the step M5, the actual braking request signal ascertained on the basis of the actuation of the brake pedal 2 may be ignored and the ascertained replacement braking request signal may exclusively be used to generate the brake pressure in the wheel-brake cylinder 1, at least for a predetermined time period corresponding to the time interval t25 in FIG. 3. In diagram (B) of FIG. 3, the double dot-dashed line shows a braking request generated in the described method M by actuating the brake pedal 2 after the failure of the first pressure generating device 10, wherein the corresponding travel of the pedal 2 and the associated pedal force are shown as a solid line in diagrams (C) and (D) of FIG. 3. The dot-dashed line in diagram (B) of FIG. 3 shows the replacement braking request signal. The solid line in diagram (B) of FIG. 3 shows the sum of the replacement braking request signal and the braking request signal generated by actuating the brake pedal 2. As can be seen in diagrams (B) to (D) of FIG. 3, from the time point t5, the replacement braking request signal can be reduced to zero within a predetermined transition period t57 until the time point t7, e.g., by linearly reducing the replacement braking request signal, as shown by way of example in FIG. 3. In order to keep constant the sum of the braking request signal generated by actuating the brake pedal 2 and of the replacement braking request signal, the driver must compensate for the reduction of the replacement braking request signal by actuating the pedal 2. This is shown by way of example in FIG. 3, wherein at the time point t7, the replacement braking request is reduced to zero and the braking request signal is again provided exclusively by actuating the pedal 2. As described above, within the transition period t57, the replacement brake pressure is thus generated based on a sum of the braking request signal and of the replacement braking request signal. An advantage of this procedure is that the pedal 2 can be actuated less quickly or firmly by the driver in order to maintain the deceleration of the vehicle.

Diagrams (A) to (D) shown in FIG. 4 represent a braking sequence which is performed according to the described method M with the brake system 100 described above, if the brake torque is initially achieved exclusively by the generator operation of the electric machine 150 (step M22 of the method M is performed).

At the time point t0 shown in FIG. 4, no brake pressure is generated by means of the first pressure generating device 10 since the electric machine generates the desired brake torque by itself. That is to say, the steps M1, M22 and M3 of the method M from FIG. 2 are performed. As can be seen in diagram (C) of FIG. 4, the pedal 2 is held displaced by a constant travel. Accordingly, the braking request shown in diagram (B) of FIG. 4, as well as the opposing force on the pedal 2 shown in diagram (D) of FIG. 4 are constant.

At the time point t1, during the performance of the step M3, a fault state of the first pressure generating device 10 is detected. In the present case, this may, for example, be a failure of the actuation sensor 30. The first separator valves 13A are therefore opened and the second separator valves 13B are preferably closed, as described above. As a result of opening the first separator valves 13A, the pedal 2 is displaced further due to the actuation of the pedal 2 by the driver (diagram (C) of FIG. 4), wherein the pedal force decreases due to the now missing return force of the simulator 14 (diagram (D) of FIG. 4). Diagram (A) of FIG. 4 shows, in a solid line, the further profile of the brake pressure generated by performing the method M by means of the brake pressure control system 120. The dashed line shown in diagram (A) of FIG. 4 shows the brake pressure that the brake pressure control system 120 would generate if it were actuated exclusively on the basis of the braking request signal and not based on the replacement braking request signal. As can be seen in diagram (A) of FIG. 4, the brake pressure increases slightly at the time point t1 since as a result of opening the first separator valves 13A and actuating the pedal 2, brake fluid flows out of the main brake cylinder 12. Since the actuation sensor 30 in the present example fails, the braking request starts at the time point t1. It may optionally also be provided that upon detection of a fault state in the brake force generation assembly 110 or in the first pressure generating device 10, the braking request signal is initially generated based on the pressure sensed by the pressure sensor 31. In this case as well, the braking request would be very small at the time point t1 since merely a pressure equalization takes place as a result of opening the first separator valves 13A.

As can be seen from the dot-dashed line in diagram (B) in FIG. 4, the replacement braking request signal is generated (step M4 of the method M) from the time point t2. The delay at the time point t1 results, for example, due to the evaluation time or computing time required by the control system 130, in particular the first control unit 131, to ascertain the replacement braking request signal. As can be seen in diagram (B) of FIG. 4, the replacement braking request signal is generated to correspond to the last valid braking request signal prior to the time point t1. Due to the replacement braking request signal, the second pressure generating device 20 of the brake pressure control system 120 starts to build up the brake pressure in the wheel-brake cylinder 1, wherein at the time point t4, the brake pressure that corresponds to the brake torque represented by the braking request is reached, as can be seen from the profile of the solid line in diagram (A) of FIG. 4. For example, this brake torque may correspond to the brake torque previously generated by the electric machine 150, wherein the generator operation of the electric machine 150 is stopped. The time interval t24 between the time points t2 and t4 may thus be referred to as the response time of the brake pressure control system 120. As can be seen from the dashed line in diagram (A) of FIG. 4, without the described method M, the pressure would initially remain constant until the driver responds and pushes the pedal 2 more, which again takes place from the time point t5, as can be seen in diagrams (C) and (D) of FIG. 4. The time interval t25 between the time points t2 and t5 can thus be considered as the response time of the driver.

In diagrams (A) to (C), the dashed line shows in each case the profile that would result without the method M if the actuation of the pedal 2 were exclusively used to generate the braking request signal or the resulting pressure sensed by the pressure sensor 31. As can be seen from the profile of the dashed lines in diagrams (C) and (D) of FIG. 4, the travel of the pedal 2 is increased again from the time point t5 due to the increase in the pedal force. Accordingly, brake volume is displaced into the wheel-brake cylinder 1, the pressure sensed by the pressure sensor 31 increases, and the braking request actually generated by the driver increases again, as can be seen from the dashed line in diagram (B) of FIG. 4, whereby the brake pressure control system 120 is caused to adjust the brake pressure accordingly, wherein at the time point t6, the brake pressure that existed prior to the failure of the first pressure generating device 10 is reached (dashed line in diagram (A) of FIG. 3). The time interval t46 thus represents the reduction in time that can be achieved by the above-described method M in order to restore the brake torque present prior to the failure of the first pressure generating device 10.

As shown by way of example in diagrams (B) to (D) of FIG. 4 and as already explained above in connection with FIG. 3, a transition sequence may be carried out from the time point t5 during the performance of the method M. As already explained, during the performance of the step M5, the actual braking request signal ascertained on the basis of the actuation of the brake pedal 2 may be ignored and the ascertained replacement braking request signal may exclusively be used to generate the brake pressure in the wheel-brake cylinder 1, at least for a predetermined time period corresponding to the time interval t25 in FIG. 4. In diagram (B) of FIG. 4, the double dot-dashed line shows a braking request generated in the described method M by actuating the brake pedal 2 after the failure of the first pressure generating device 10, wherein the corresponding travel of the pedal 2 and the associated pedal force are shown as a solid line in the diagrams (C) and (D) of FIG. 4. The dot-dashed line in diagram (B) of FIG. 4 shows the replacement braking request signal. The solid line in diagram (B) of FIG. 4 shows the sum of the replacement braking request signal and the braking request signal generated by actuating the brake pedal 2. As can be seen in diagrams (B) to (D) of FIG. 4, from the time point t5, the replacement braking request signal can be reduced to zero until the time point t7, e.g., linearly as shown in FIG. 4. The time period between t5 and t7 is therefore referred to as the transition period t57. In order to keep constant the sum of the braking request signal generated by actuating the brake pedal 2 and of the replacement braking request signal, the driver must compensate for the reduction of the replacement braking request signal by actuating the pedal 2. In the example shown in FIG. 4, at the time point t7, the replacement braking request is at zero and the braking request signal is again generated exclusively by actuating the pedal 2. As described above, within the transition period t57, the replacement brake pressure is thus generated based on a sum of the braking request signal and of the replacement braking request signal. An advantage of this procedure is that the pedal 2 can be actuated less quickly or firmly by the driver in order to maintain the deceleration of the vehicle.

Although the present invention has been explained above by way of example with reference to exemplary embodiments, it is not limited thereto but can be modified in many ways. Combinations of the above exemplary embodiments are in particular also possible.

The invention claimed is:

1. A method for braking a vehicle, comprising the following steps:
   detecting a braking request signal representing a target deceleration of the vehicle;
   generating a hydraulic brake pressure in a wheel-brake cylinder based on the detected braking request signal using a first pressure generating device, which is hydraulically connected to the wheel-brake cylinder;
   detecting a fault state of the first pressure generating device;
   ascertaining a replacement braking request signal when the fault state of the first pressure generating device is detected, wherein the replacement braking request signal is ascertained based on a target deceleration known at a predetermined time point prior to the detection of the fault state; and
   generating a replacement brake pressure in the wheel-brake cylinder based on the ascertained replacement braking request signal using a brake pressure control system, which includes a second pressure generating device hydraulically coupled to the wheel-brake cylinder.

2. The method according to claim 1, wherein: (i) the detecting of the braking request signal includes sensing an actuation of a brake actuating device, and/or (ii) the ascertaining of the replacement braking request signal includes ascertaining a travel of a brake actuating device at the predetermined time point prior to the detection of the fault state.

3. The method according to claim 1, wherein the ascertaining of the replacement braking request signal includes ascertaining a brake pressure in the wheel-brake cylinder at the predetermined time point prior to the detection of the fault state.

4. The method according to claim 1, further comprising:
   generating a brake torque based on the braking request signal using an electric machine kinematically coupled to a wheel of the vehicle.

5. The method according to claim 4, wherein the replacement brake torque is ascertained based on the brake torque generated by the electric machine.

6. The method according to claim 1, wherein the brake pressure control system includes a first control unit which actuates the second pressure generating device, and wherein the fault state of the first pressure generating device is detected based on a control signal sent to the first control unit.

7. The method according to claim 6, wherein the first pressure generating device is actuated by a second control unit based on the braking request signal, wherein the second control unit generates the first control signal and sends it to the first control unit.

8. The method according to claim 1, wherein the generating of the replacement brake pressure includes generating: i) a linear, and/or ii) a stepwise, and/or iii) a progressive, or a degressive, pressure increase in the wheel-brake cylinder.

9. The method according to claim 2, wherein, by actuating the brake actuating device using a main brake cylinder, a hydraulic return pressure is generated in a return simulator, and wherein, when the fault state of the first pressure generating device is detected, the main brake cylinder is hydraulically coupled to the wheel-brake cylinder, and the first pressure generating device is hydraulically separated from the wheel-brake cylinder.

10. A method for braking a vehicle, comprising the following steps:
   detecting a braking request signal representing a target deceleration of the vehicle;
   generating a brake torque based on the braking request signal using an electric machine kinematically coupled to a wheel of the vehicle;
   providing a first pressure generating device hydraulically connected to a wheel-brake cylinder, for generating a brake pressure in the wheel-brake cylinder based on the braking request signal;
   detecting a fault state of the first pressure generating device;
   ascertaining a replacement braking request signal when the fault state of the first pressure generating device is detected, wherein the replacement braking request signal based on a target deceleration known at a predetermined time point prior to the detection of the fault state is ascertained based on the brake torque generated by the electric machine; and
   generating a replacement brake pressure in the wheel-brake cylinder based on the ascertained replacement braking request signal using a brake pressure control system which includes a second pressure generating device hydraulically coupled to the wheel-brake cylinder.

11. The method according to claim 10, wherein the replacement brake pressure is generated for a predetermined first time period based on the ascertained replacement braking request signal, and the replacement braking request signal is subsequently reduced linearly to zero within a transition period, wherein during the transition period, the replacement brake pressure is generated using the brake pressure control system based on a sum of the replacement braking request signal and of the sensed braking request signal.

12. A brake system for a vehicle, comprising:
   a sensor configured to sense a braking request;
   a wheel-brake cylinder configured to generate a frictional force on a wheel of the vehicle;
   a first pressure generating device, which is hydraulically coupled to the wheel-brake cylinder and is configured to generate a hydraulic pressure in the wheel-brake cylinder;
   a brake pressure control system including a second pressure generating device, which is hydraulically coupled to the wheel-brake cylinder and is configured to generate a hydraulic pressure in the wheel-brake cylinder independently of the first pressure generating device; and
   a control system, which is connected by signals to the sensor, the first pressure generating device, and the brake pressure control system, and is configured to cause the brake system to:
      detect the braking request signal, the braking request signal representing a target deceleration of the vehicle,
      generate a hydraulic brake pressure in the wheel-brake cylinder based on the detected braking request signal using the first pressure generating device, which is hydraulically connected to the wheel-brake cylinder,
      detecting a fault state of the first pressure generating device,
      ascertain a replacement braking request signal when the fault state of the first pressure generating device is detected, wherein the replacement braking request signal is ascertained based on a target deceleration known at a predetermined time point prior to the detection of the fault state, and
      generate a replacement brake pressure in the wheel-brake cylinder based on the ascertained replacement braking request signal using the brake pressure control system.

13. The brake system according to claim 12, wherein the sensor for sensing the braking request signal is an actuation sensor configured to sense an actuation including a travel of a brake actuating device.

* * * * *